United States Patent
Madiot et al.

(10) Patent No.: US 11,221,020 B2
(45) Date of Patent: Jan. 11, 2022

(54) DIMENSIONING OF THE SKELETON ANGLE OF THE TRAILING EDGE OF THE ARMS CROSSING THE BY-PASS FLOW OF A TURBOFAN

(71) Applicant: SAFRAN AIRCRAFT ENGINES, Paris (FR)

(72) Inventors: Ghislain Maxime Romuald Madiot, Moissy-Cramayel (FR); Jean Bertucchi, Moissy-Cramayel (FR); Damien Joseph Cellier, Moissy-Cramayel (FR); Irwin Pierre Robert Kernemp, Moissy-Cramayel (FR); Aurelien Mazzella, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 695 days.

(21) Appl. No.: 15/756,387

(22) PCT Filed: Sep. 2, 2016

(86) PCT No.: PCT/FR2016/052176
§ 371 (c)(1),
(2) Date: Feb. 28, 2018

(87) PCT Pub. No.: WO2017/037399
PCT Pub. Date: Mar. 9, 2017

(65) Prior Publication Data
US 2018/0252230 A1    Sep. 6, 2018

(30) Foreign Application Priority Data

Sep. 2, 2015 (FR) ...................................... 1558123

(51) Int. Cl.
*F04D 29/54* (2006.01)
*F01D 5/14* (2006.01)
(Continued)

(52) U.S. Cl.
CPC ............ *F04D 29/544* (2013.01); *F01D 5/141* (2013.01); *F01D 5/145* (2013.01); *F01D 9/041* (2013.01);
(Continued)

(58) Field of Classification Search
CPC .... F04D 29/544; F04D 29/327; F04D 29/681; F01D 5/141; F01D 5/145; F01D 9/041
See application file for complete search history.

(56) References Cited

U.S. PATENT DOCUMENTS 8,678,760 B2 * 3/2014 Clemen .................... F02K 3/06
415/211.2
2011/0255964 A1  10/2011 Clemen

FOREIGN PATENT DOCUMENTS

FR    3 004 749 A1    10/2014

OTHER PUBLICATIONS

FR 3 004 749, Specification Translated to English, FIT Database (Year: 2014).*
(Continued)

*Primary Examiner* — Woody A Lee, Jr.
*Assistant Examiner* — John S Hunter, Jr.
(74) *Attorney, Agent, or Firm* — Oblon, McClelland, Maier & Neustadt, L.L.P.

(57) ABSTRACT

A part or an assembly of parts of a splitter stage of a turbofan, including a plurality of obstacles including at least one a blade and at least one arm, and a platform from which the obstacles extend, wherein the arm is defined by a skeleton angle having a trailing value on the trailing edge of between 3° and 15°.

10 Claims, 5 Drawing Sheets

(51) Int. Cl.
*F01D 9/04* (2006.01)
*F04D 29/68* (2006.01)
*F04D 29/32* (2006.01)

(52) U.S. Cl.
CPC .......... *F04D 29/681* (2013.01); *F04D 29/327* (2013.01); *F05D 2220/36* (2013.01); *F05D 2240/122* (2013.01); *F05D 2250/38* (2013.01); *Y02T 50/60* (2013.01)

(56) References Cited

OTHER PUBLICATIONS

French Preliminary Search Report dated Jul. 13, 2016 in Patent Application No. FR 1558123 (with English translation of categories of cited documents), 3 pages.
International Search Report dated Dec. 9, 2016 in PCT/FR2016/052176 (with English translation), 12 pages.

* cited by examiner

FIG. 1

PRIOR ART

PRIOR ART

PRIOR ART

FIG. 4b

PRIOR ART

FIG. 4c

DIMENSIONING OF THE SKELETON ANGLE OF THE TRAILING EDGE OF THE ARMS CROSSING THE BY-PASS FLOW OF A TURBOFAN

GENERAL TECHNICAL FIELD

The present invention relates to a part of a bypass flow guide vane stage of a turbofan, comprising a plurality of obstacles.

PRIOR ART

Figure 1:
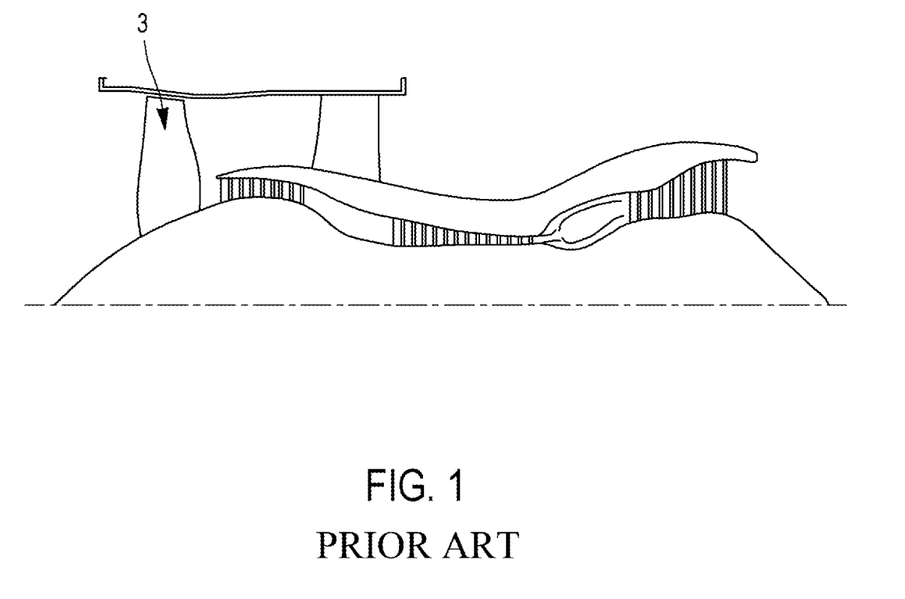
FIG. 1, previously described, shows an example of a turbine engine.

A turbofan of the type of FIG. 1 has a fan 3 compressing a large mass of cold air, of which a portion is injected into the compressor and heated (primary flow), the rest forming a cylindrical flow (bypass or secondary flow) surrounding the engine, guided by an OGV ("outlet guide vane") stage and directed rearward to create thrust.

For this purpose, the turbine engine typically comprises a hub delimiting the bypass air stream internally, and a casing delimiting the bypass air stream externally. Arms radially connect the two (the hub is fixed with respect to the casing, and movable with respect to the central shaft), and transmit a portion of the forces between the engine and its support.

In the arms pass various utilities integrating the components of the engine (such as an oil or fuel tube, cables, etc.). Two of the arms, considerably more massive, and generally placed at the peak and at the base, are called pylons and serve as a support structure allowing the turbine engine to be connected to an aircraft.

Figure 2A:
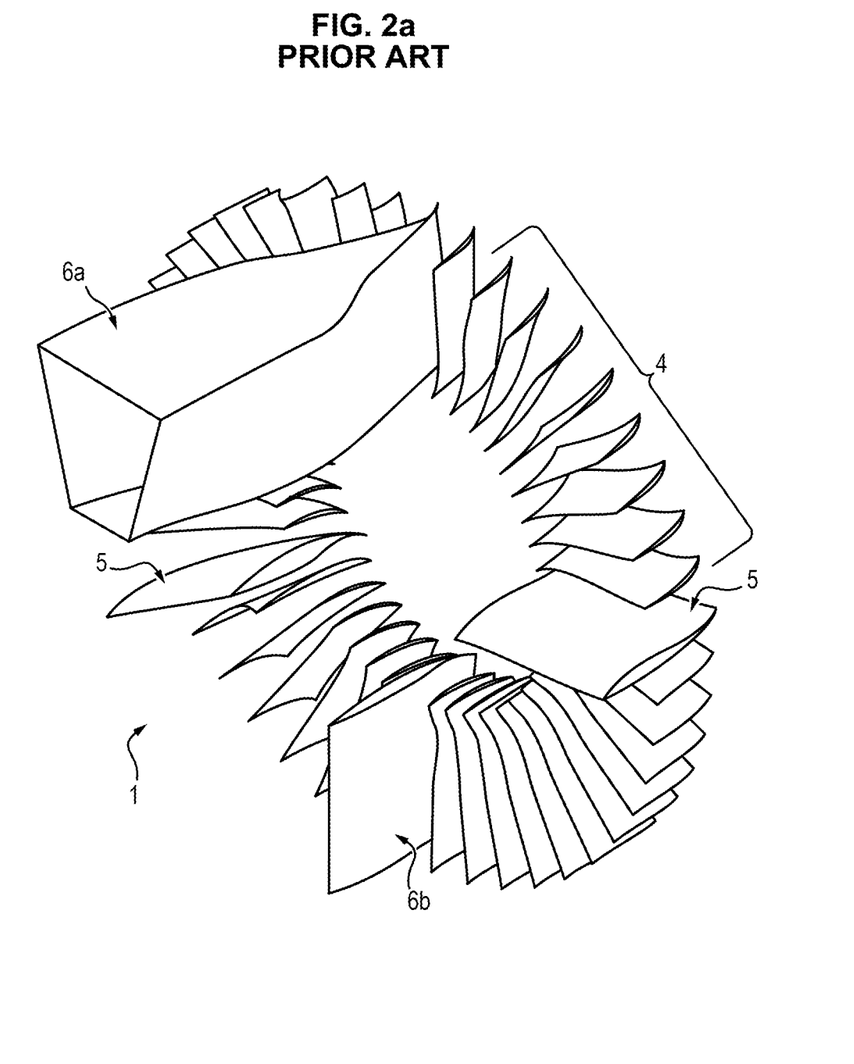
FIGS. 2a-2b illustrate splitter geometries and the physical phenomena that they generate.

The arms and/or the pylons can be combined in the same structure as the OGVs, and then be called "integrated," as can be seen in FIG. 2a (this is a rear view).

The terms "upstream" and "downstream" are defined with respect to the circulation of air in the turbine engine.

As explained, the OGVs have the function of guiding the bypass flow, but it is noted that a residual swirl in the flow persists downstream of them. This slight swirl can generate considerable separation at the trailing edge of the arms or pylons, notable for example on the arm three o'clock to the right in FIG. 2b (which shows total pressure deficits downstream of the structure of FIG. 2a), because it requires a strong deviation of the fluid at this point.

Consequently, a strong increase in losses is noted and a reflection of the distortion of the static pressure upstream.

It would thus be desirable to attenuate or cancel these separations so as to improve the performance of turbine engines.

PRESENTATION OF THE INVENTION

The present invention thus proposes, according to a first aspect, a bypass flow guide vane stage of a turbofan, comprising a plurality of obstacles including at least one blade and at least one arm, a platform from which the obstacles extend,
characterized in that said arm is defined by a skeleton angle having, at the trailing edge, a trailing value comprised between 3° and 15°.

This particular geometry of the trailing edge of an arm allows the effects of the deflection of the flow to be reduced and separation to be avoided.

According to other advantageous and non-limiting features:

said trailing value is comprised between 5° and 13°, preferably between 7° and 11°;

said arm has an inclination start position situated at between 40% and 80% of the relative length of a chord extending from a leading edge to a trailing edge of the arm, said skeleton angle having, between the curvature start position and the trailing edge, said trailing value;

the inclination start position is situated at between 50% and 70% of the relative length of the chord;

the suction side or the pressure side of the arm is substantially rectilinear between the inclination start position and the beginning of the closure of the trailing edge.

at least one arm is a pylon;

said pylon is defined by a skeleton angle having, at the trailing edge, said trailing value, said skeleton angle at the trailing edge being oriented so as to bring the suction side of the pylon closer to the longitudinal axis of the turbine engine;

one arm not being a pylon and situated at the suction side of the pylon is defined by a skeleton angle having, at the trailing edge, said trailing value, said skeleton angle at the trailing edge being oriented so as to bring the suction side of the arm closer to the longitudinal axis of the turbine engine;

one arm not being a pylon and situated at the pressure side of the pylon is defined by a skeleton angle having, at the trailing edge, said trailing value, said skeleton angle at the trailing edge being oriented so as to bring the pressure side of the arm closer to the longitudinal axis of the turbine engine;

said trailing value increases in absolute value with the proximity of the arm to the pylon.

According to a second aspect, the invention relates to a turbine engine comprising a part according to the first aspect.

PRESENTATION OF THE FIGURES

Other features and advantages of the present invention will appear upon reading the description that follows of a preferred embodiment. This description will be given with reference to the appended drawings in which.

DETAILED DESCRIPTION

The present invention relates to a part 1 (or set of parts if it is not made in one piece) of a turbine engine having a plurality of obstacles 4, 5, 6a, 6b and a platform 2 from which the obstacles 4, 5, 6a, 6b extend.

A turbofan typically comprises, as previously explained, a hub delimiting the bypass air stream internally, and a casing delimiting the bypass air stream externally. Arms radially connect the two and transmit a portion of the forces between the engine and its support.

The present part or set of parts 1 is a bypass flow guide vane stage part, i.e. a stator part, in particular a ring of stationary blades (called OGV for "outlet guide vane"), is most often disposed at the outlet of the fan rotor 3.

The term "obstacle" designates any element positioned transversely to the air flow and having an influence on its flow, having a leading edge BA, a trailing edge BF, a pressure side and a suction side.

For the most part, these are OGV blades 4, but at least one of the obstacles is an arm 5, 6a, 6b, i.e. a wider, longer and less streamlined element than the blades 4, having as explained more of a structural function than an aerodynamic one, in particular for connecting the platform 2 to a casing or to a hub of the part 1, and/or for the passage of utilities. In particular, it will be understood that the arms 5, 6a, 6b have a trailing edge notably further downstream (with respect to the flow of fluid) of the trailing edge of the blades 4.

Generally, it will be understood that the obstacles 5, 6a, 6b are selected among the blades 4 and the arms 5, 6a, 6b, of which the latter can be of several types.

Preferably, as can be seen in FIG. 2a, one or two of the arms are pylons, in particular a main pylon 6a disposed at the top of the part 1 (the so-called twelve o'clock position), and/or a secondary pylon 6b disposed at the bottom of the part 1 (the so-called six o'clock position). The two pylons are thus diametrically opposed. The pylons 6a, 6b are distinctly more massive than the other arms 5 (which are themselves distinctly more massive than the blades 4), and the main pylon 6a is itself distinctly more massive than the secondary pylon 6b. In other words, the pylons 6a, 6b (and particularly the main pylon 6a) have a trailing edge noticeably further downstream than the trailing edge of the other arms 5. The latter can be disposed, regularly or not, between the pylons 6a, 6b. Hereafter in the present description, the example of the arm called three o'clock, disposed between the suction side of the main pylon 6a and the pressure side of the pylon 6b, will be used in particular.

The pylons are support elements of the entire turbine engine, in particular the main pylon 6a which allows attachment to the aircraft.

The term platform is interpreted here in the broad sense and designates generally any element of a turbine engine on which the obstacles 4, 5, 6a, 6b are capable of being mounted (by extending radially) and having an internal/external wall against which the air circulates. The platform 2 generally has an annular shape along which is disposed said plurality of obstacles 4, 5, 6a, 6b.

In particular, the platform 2 can be formed in a single piece (and thus support all the blades of the part 1) or formed of a plurality of elementary members each supporting a single blade 4 (a "root" of the blade 4) so as to constitute a vane.

In addition, the platform 2 can delimit a radially interior wall of the part 1 (the gas passing around it) by defining a hub, and or a radially exterior wall of the part 1 (the gas passing inside, the blades 3 extending toward the center) by then defining a casing of the part 1. It should be noted that the same part 1 can simultaneously comprise these two types of platform 2, which is typically the case in OGVs.

Influence of the Pylon

The applicant has noted that the large separations and fluid recirculations in the upper portion of the arms are essentially due to the influence of the arms on one another, in particular the influence of the pylons 6a, 6b on the conventional arms 5, due to the difference in their size.

Figure 3:
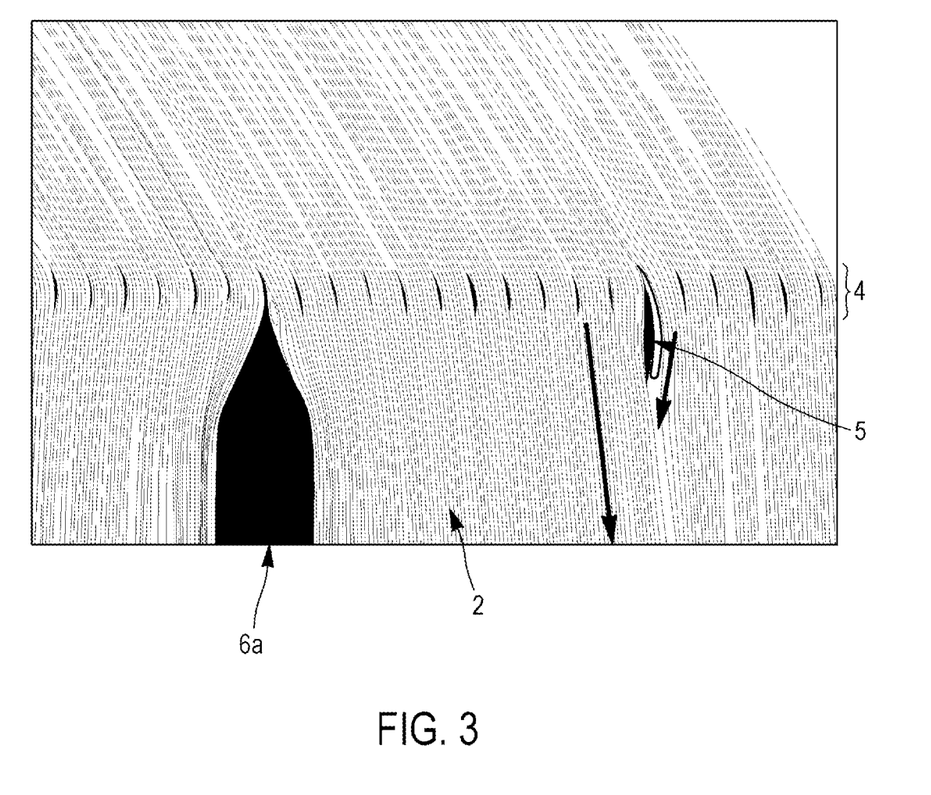
FIG. 3 shows in detail the current flow in the guiding stage.

With reference to FIG. 3, which represents the aerodynamic impacts on a known geometry, it is thus observed that the main pylon 6a causes a bifurcation of the fluid which deflects the fluid on either side. More precisely, on the suction side of the main pylon 6a the fluid has a slight rotation tending to cause the fluid to move away from the suction side of this main pylon 6a (clockwise, i.e. antitrigonometric rotation when seen from the rear of the turbine engine, where the suction side is to the right and the pressure side to the left), and at the pressure side of the main pylon 6a the fluid has a slight rotation tending to cause the fluid to move away from the pressure side of this main pylon 6a (counter-clockwise, i.e. trigonometric rotation when seen from the rear of the turbine engine in the example shown).

The arm three o'clock, which can be seen in this FIG. 3, is situated at the suction side of the main pylon 6a. And in known fashion the downstream portion of an arm 5, 6a, 6b (i.e. the portion terminated by the trailing edge BF) follows a substantially axial geometry. This signifies that the departing portion of the arm 5, 6a, 6b is substantially symmetrical with respect to the longitudinal axis of the turbine engine, which is consistent with the desired function of guiding the flow.

Figure 2B:
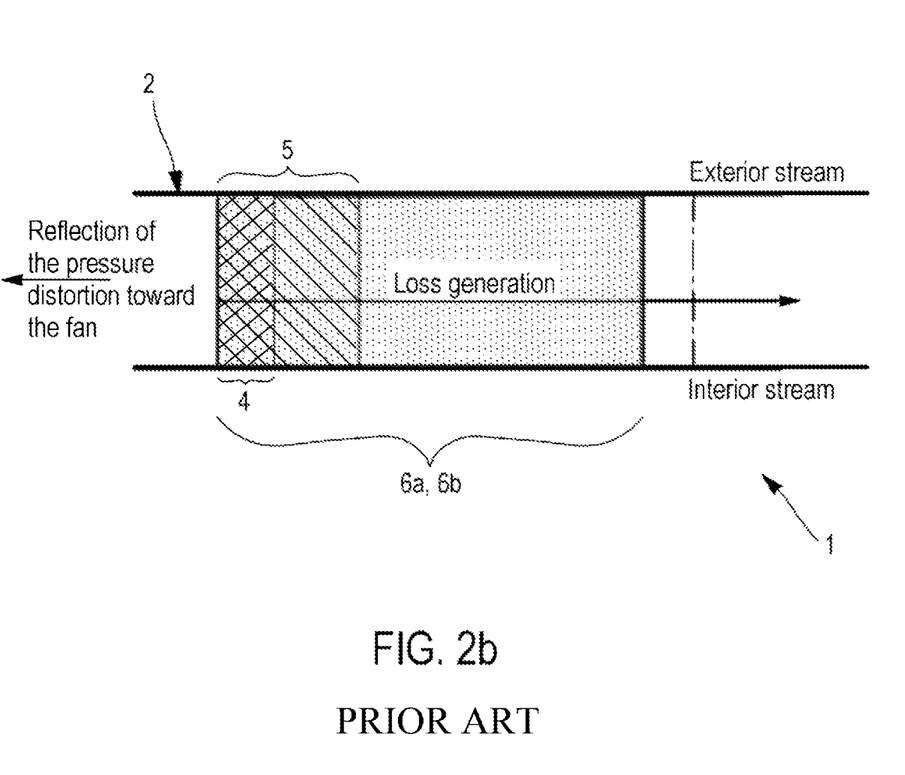

Now due to the fact of the deflection caused by the main pylon 6a, the fluid strikes the pressure side of the arm 5, and on the contrary does not follow the suction side of the arm 5, hence the separation (which can be seen very well in FIG. 2b). A similar, but symmetrical effect, occurs at the pressure side of the pylon 6a. In addition, similar though smaller effects, are caused by the secondary pylon 6b.

By "longitudinal axis of the turbine engine" is meant the symmetry axis of the turbine engine, which coincides with the rotation axis of the shaft and of the fan 3. Generally, hereafter in the text, when reference is made to the longitudinal axis of the turbine engine and to the trailing value, this value with respect to this axis is understood to be an angle facing the direction of the longitudinal axis of the turbine engine (called simply the longitudinal direction hereafter), that is by considering a projection on a plane tangent to the platform 2 and not an absolute value in space.

Figure 4A:
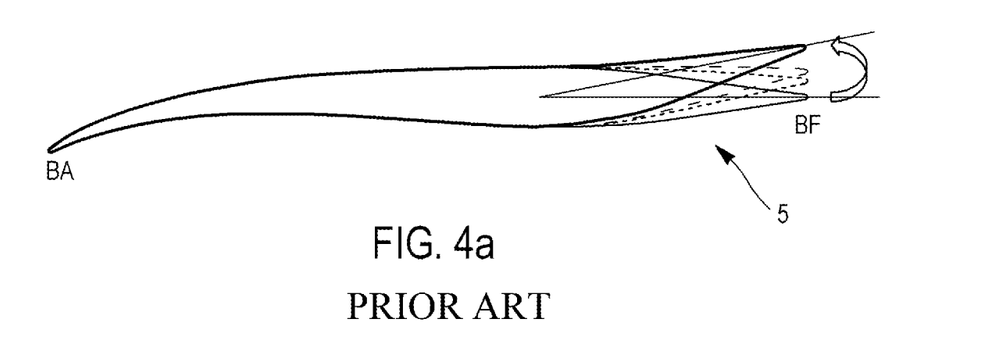
FIGS. 4a-4c show three cases of profile geometries of arms in a part according to the invention.
Figure 4B:
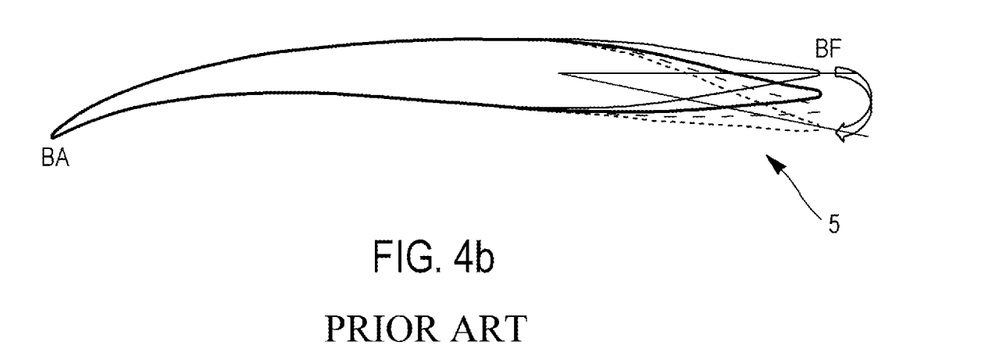
Figure 4C:
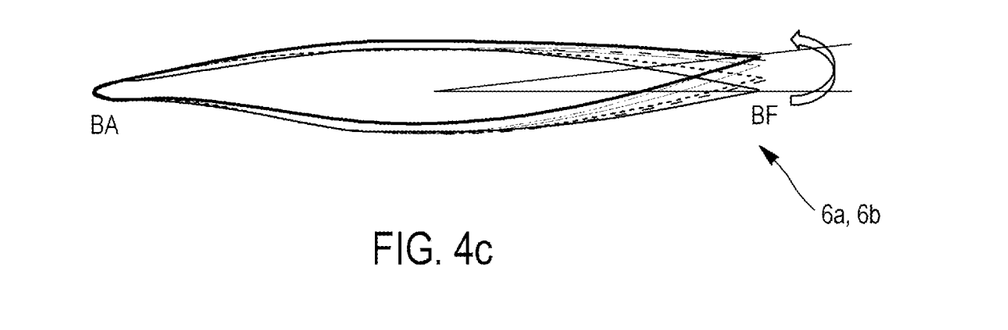

Consequently, with reference to FIGS. 4a-4c (which compares known profiles (light solid line) with several profiles according to the invention corresponding to different trailing values (thick solid and dotted lines)), the present part 1 is distinguished by a particular geometry of at least one obstacle of the arm type, where it is a "conventional" arm 5 or a pylon 6a, 6b. Each of the three associated cases will be described later.

The idea is to modify the suction side and/or pressure side slope of these arms to take into account and/or limit (depending on the arm involved) the influence of the bifurcation caused by the main pylon 6a and the blades 4 on the fluid field.

The present invention thus proposes to modify this departing portion by orienting it from 5° to 13° with respect to the base geometry. As will be seen, this variation of 5° to 13° is in absolute value and can be positive or negative depending on the case.

In other words, by using a skeleton of the arm (that is the curve passing through all the centers of the segments perpendicular to the reference chord of the section, i.e. the chord extending from the leading edge BA to the trailing edge BF of the arm 5, 6a, 6b), this skeleton of the arm is selected so as to have, beyond an "inclination start point," said angle of 5° to 13° with respect to the longitudinal angle of the turbine engine. By using the "skeleton angle law", which corresponds to the derivative of the skeleton of the section of the blade, this signifies that beyond said inclination start point the skeleton angle has said value (in absolute value) between 5° and 15°, i.e. that the derivative (in the position of an axial position) is between tan 5° and tan 13°. Hereafter in the description, the "trailing value" will designate the value of the skeleton angle at the trailing edge, independently of its sign.

This selection may seem to contradict the objective of guiding the flow, but as will be seen later the Applicant's tests demonstrate a gain in efficiency.

The objective of this deflection is to align the pressure side/suction side (depending on the case) of the arm with the direction of the fluid field so as to limit separation and eliminate the associated negative effects.

The position of the start of inclination (i.e. the position of the beginning of variation of the skeleton angle with respect to the reference geometries) mentioned earlier is advantageously situated between 40% and 80% (preferably between 50 and 70%, and more preferably around 60%) of the relative length of a chord extending from the leading edge BA to the trailing edge BF of the arm 5, 6a, 6b.

Thus, the inclination start point is advantageously close to the maximum thickness zone of the arm.

Upstream of this point, the arm is advantageously unchanged, and downstream (i.e. between the curvature start position and the trailing edge BF) said skeleton angle advantageously has said trailing value between 5° and 13°.

Downstream of this point (more precisely until the beginning of the closure of the trailing edge BF), the suction side or pressure side (depending on the case, as will be seen later) of the arm 5, 6a, 6b is advantageously substantially rectilinear.

By "closure of the trailing edge" is meant the last few percent (typically the last five percent) of the length of the chord which have a rounded shape, because it is not physically possible to have a perfect edge at the end of the arm (this would imply a non-continuous derivative), and in practice the trailing edge has a tangent orthogonal to the skeleton line. Thus, at the closure start point, the skeleton angle varies suddenly so as to be able to close the geometry. A similar closure is found at the leading edge BA.

In other words, it can be considered that the suction side or the pressure side can be substantially rectilinear virtually to the trailing edge, within the inaccuracies due to the closure of the geometry at the trailing edge.

First Case—Conventional Arms, Suction Side

FIG. 4a shows the case of a conventional arm 5 situated at the suction side of a pylon 6a, 6b, in particular at the suction side of the main pylon 6a. With reference to FIG. 2a, this is the conventional arm(s) 5 situated in the right portion of this figure.

As explained, in such a case the flow deflected by the pylon 6a, 6b so as to remove itself from it (rotation in the antitrigonometric direction) has a tendency to strike the pressure side of the arm 5 and to separate from the suction side of the arm 5.

Thus, said departure angle of 5° to 13° is selected in the pressure side to suction side direction, so as to increase the slope of the pressure side and limit the slope of the suction side, in other words to move the suction side closer to the longitudinal axis of the turbine engine (that is to make its orientation tend toward the longitudinal direction, see below).

In our example, this is an angle of from +5° to +13° (trigonometric direction). This angle is preferably between +7° and +11°, and even more advantageously around +9°.

Moreover, it should be noted that the angle can depend on the proximity to the main pylon 6a: if there are several conventional arms 5 between the main pylon 6a and the secondary pylon 6b, the closer the arm is to the main pylon, the more the angle is chosen to be high.

An increase in the derivative is observed beyond the curvature start point, which takes on a value (advantageously substantially constant beyond the curvature start point, as will be explained) between −14 and +10. This gives a suction side exit angle taking on a value substantially greater than in the prior art, i.e. between −6° and +6° (still with respect to the longitudinal axis of the turbine engine), advantageously around 0°, i.e. a suction side close to, or substantially aligned with the axis of the turbine engine.

The suction side slope is advantageously quasi-rectilinear (zero second derivative) over at least the last 20% of the chord, advantageously beyond the curvature start point (within the trailing-edge closure).

Second Case—Conventional Arm, Pressure Side

FIG. 4b shows the case of a conventional arm 5 situated at the pressure side of a pylon 6a, 6b, in particular at the pressure side of the main pylon 6a. With reference to FIG. 2a, this is (these are) conventional arm(s) 5 situated in the left portion of this figure.

As explained, in such a case the flow deflected by the pylon 6a, 6b so as to remove itself from it (rotation in the trigonometric direction) has a tendency to strike the suction side of the blade 5 and to separate from the pressure side of the blade 5.

Thus, said departure angle of 3° to 15° is selected in the suction side to pressure side direction, so as to increase the slope of the suction side and limit the slope of the pressure side, in other words to have the pressure side closer to the longitudinal axis of the turbine engine (i.e. have its orientation tend toward the longitudinal direction, see below).

In our example, it is an angle of −13° to −5° (antitrigonometric direction). This angle is preferably between −11° and −7°, and even more advantageously around −9°.

Moreover, it should be noted that the angle can depend on proximity to the main pylon 6a: if there are several conventional arms 5 between the main pylon 6a and the secondary pylon 6b, the more the arm is close to the main pylon, the more the angle is selected to be small (i.e. with a higher absolute value).

A reduction in the derivative is observed beyond the curvature start point, which takes on a value (advantageously substantially constant beyond the curvature start point, as will be explained) between −1 and +20. This gives a pressure side exit angle assuming a substantially lower value than in the prior art, i.e. between −6° and +6° (still with respect to the longitudinal axis of the turbine engine), advantageously around 0°, i.e. a pressure side close to, or substantially aligned with the axis of the turbine engine.

The pressure side slope is advantageously quasi-rectilinear (zero second derivative) over at least the last 20% of the chord, advantageously beyond the curvature start point (within the closure of the trailing edge).

In summary, at least one (preferably a plurality of) arms 5 which are not a pylon 6a, 6b is defined by a skeleton angle having at the trailing edge BF, said trailing value comprised between 5° and 13° (in absolute value) with respect to the longitudinal axis of the turbine engine.

Either the arm 5 in question is situated at the suction side of the pylon 6a, 6b, and then said skeleton angle at the trailing edge BF is oriented so as to put the suction side of the arm 5 closer to the longitudinal axis of the turbine engine (in other words the departure angle is positive, i.e. oriented in the trigonometric direction).

Or the arm 5 in question is situated at the pressure side of the pylon 6a, 6b, and then said skeleton angle at the trailing edge BF is oriented so as to put the pressure side of the arm 5 closer to the longitudinal axis of the turbine engine (in other words the departure angle is negative, i.e. oriented in the antitrigonometric direction).

It will be well understood that it is completely possible to combine the two types of deflections in the same turbine engine. In fact, this can relate to each arm 5 not being a pylon (both on the suction side and on the pressure side), but preferably the arms at a certain distance (in angular terms) of any pylon 6a, 6b are not involved, in other words said trailing value is applied to any arm 5 at less than a certain distance from a pylon 6a, 6b.

In any case, said trailing value preferably increases in absolute value with the proximity of the arm 5 to the pylon 6a, 6b, i.e. the more the arm 5 is far from the pylon 6a, 6b, the more the direction of the skeleton at the trailing edge BF is distant from the longitudinal direction of the turbine engine. The variation can be between different types: for example, if the $1^{st}$ arm 5, defined as near the pylon 6a, 6b, has a maximum trailing value—for example 13°, and the $n^{th}$ arm near the pylon 6a, 6b has the minimum trailing value—for example 5°, and between the two the trailing value can vary linearly, polynomially, hyperbolically, etc. (but monotonically), from the minimum value to the maximum value.

Third Case—Pylon

FIG. 4c shows the case of a pylon 6a, 6b (in this particular case the main pylon 6a). As explained, these pylons 6a, 6b have a tendency to generate strong distortions of pressure at their suction side (because naturally, prior to guiding, the direction of rotation of the fluid is that of the rotation of the fan 3, and encounters all the obstacles 4, 5, 6a, 6b under their pressure side, see FIG. 3).

Thus, said departure angle of 5° to 13° is selected in the pressure side to suction side direction, so as to increase the slope of the pressure side and limit the slope of the suction side, in other words to put the suction side closer to the longitudinal axis of the turbine engine (i.e. to cause its orientation to tend toward the longitudinal direction, see below). In our example, it is an angle of +5° to +13° (trigonometric direction). This angle is preferably +7° and +11°, and more advantageously still around +9°.

It is observed beyond the curvature start point an increase in the derivative, which takes on a value (advantageously substantially constant beyond the curvature start point, as will be explained) between −14 and +10. This gives a suction side exit angle taking on a value substantially higher than in the prior art, i.e. between −6° and +6° (still with respect to the longitudinal axis of the turbine engine), advantageously around 0°, i.e. a suction side close to or substantially aligned with the axis of the turbine engine.

The suction side slope is advantageously quasi-rectilinear (zero second derivative) over at least the last 20% of the chord, advantageously beyond the curvature start point (within the closure of the trailing edge).

Effects

The pressure gradient is substantially reduced and separation eliminated. Recirculation is also eliminated.

The associated tests show a reduction in the OGV losses of 0.02%, a reduction in OGV/arm losses of 0.03%, a reduction in fairing losses of 0.01%, and a reduction in static pressure distortion of 1.5%. Summarizing, the losses are reduced by 0.03% and the distortion at the fan outlet is reduced by 0.3%.

The separation is substantially reduced as well as the wake thickness downstream of the pylons.

The associated tests show a reduction in fairing losses of 0.02% and a reduction in static pressure distortion of 0.3%. Summarizing, the losses are reduced by 0.02% and the distortion at the fan outlet is reduced by 0.3%.

The gains arise from the fact that less "effort" is required of the fluid at the suction side of the blade. The need for deflection to "close" the profile at the trailing edge is displaced partially or completely to the pressure side, which allows the aforementioned gain to be obtained.

The invention claimed is:

1. A bypass flow guide vane stage of a turbine engine of a turbofan type, comprising:
    a plurality of obstacles including
        a blade,
        a pylon, and
        an arm which is not said pylon; and
    a platform from which said plurality of obstacles extend,
    wherein said pylon and the arm are both wider and longer than the blade, the arm is more massive than the blade, and said pylon is more massive than the arm,
    wherein said pylon is defined by a pylon skeleton angle having, at a trailing edge of said pylon, a trailing value between 5° and 13° with respect to a longitudinal axis of the turbine engine, said pylon skeleton angle at the trailing edge of said pylon being oriented so as to cause an orientation of a suction side of said pylon to tend forward the longitudinal axis of the turbine engine, and
    wherein the trailing edge of said pylon is disposed downstream of a trailing edge of the arm and downstream of a trailing edge of the blade, and the trailing edge of the arm is disposed downstream of the trailing edge of the blade.

2. The guide vane stage according to claim 1, wherein said trailing value is between 7° and 11°.

3. The guide vane stage according to claim 1, wherein said pylon has an inclination start position situated at between 40% and 80% of a relative length of a chord extending from a leading edge to the trailing edge of said pylon, said pylon skeleton angle having said trailing value between a curvature start position and the trailing edge of said pylon.

4. The guide vane stage according to claim 3, wherein the inclination start position is situated at between 50% and 70% of the relative length of the chord.

5. The guide vane stage according to claim 1, wherein the suction side or a pressure side of said pylon is rectilinear between the inclination start position and a beginning of a closure of the trailing edge of said pylon.

6. The guide vane stage according to claim 1, wherein said arm is defined by an arm skeleton angle having, at the trailing edge of said arm, said trailing value.

7. The guide vane stage according to claim 6, wherein said arm is situated at the suction side of said pylon, said arm skeleton angle at the trailing edge of said arm being oriented so as to cause an orientation of a suction side of said arm to tend forward the longitudinal axis of the turbine engine.

8. The guide vane stage according to claim 6, wherein said arm is situated at a pressure side of said pylon, said arm skeleton angle at the trailing edge of said arm being oriented so as to cause an orientation of a pressure side of said arm to tend forward the longitudinal axis of the turbine engine.

9. The guide vane stage according to claim 6, wherein said trailing value increases in absolute value with proximity of said arm to said pylon.

10. A turbine engine comprising the bypass flow guide vane stage according to claim 1.

\* \* \* \* \*